United States Patent [19]

Innes

[11] Patent Number: 4,595,980

[45] Date of Patent: Jun. 17, 1986

[54] INTERACTIVE DATA PROCESSING SYSTEM HAVING CONCURRENT MULTI-LINGUAL INPUTS

[75] Inventor: John G. Innes, Arlington, Tex.

[73] Assignee: International Business Machines Corp., Armonk, N.Y.

[21] Appl. No.: 517,642

[22] Filed: Jul. 27, 1983

[51] Int. Cl.[4] ............................................. G06F 15/00
[52] U.S. Cl. ..................................... 364/200; 364/300
[58] Field of Search ............... 364/419, 521, 522, 300, 364/200, 900 MS File; 235/376, 382

[56] References Cited

U.S. PATENT DOCUMENTS

| | | | |
|---|---|---|---|
| 4,319,336 | 3/1982 | Anderson et al. | 364/900 |
| 4,365,315 | 12/1982 | Jamnik | 364/900 |
| 4,456,969 | 6/1984 | Herzik et al. | 364/900 |
| 4,499,553 | 2/1985 | Dickinson et al. | 364/900 |
| 4,500,964 | 2/1985 | Nickle | 364/300 |
| 4,507,750 | 3/1985 | Frantz et al. | 364/900 |

*Primary Examiner*—James D. Thomas
*Assistant Examiner*—Thomas Lee
*Attorney, Agent, or Firm*—C. Lamont Whitham; James H. Barksdale; Thomas F. Galvin

[57] ABSTRACT

A distributed, interactive data processing system provided with the ability to allow concurrent multi-lingual use by a plurality of users having different national language preferences is further provided with the ability to be independent of the national language in which an input to the data processing system is received. A message model data collection (18) is established by storing message models via a message identifier primary key and a secondary key that is the national language index. A central message service (17) is used to compose messages from message models retrieved from the message model data collection (18) using the primary and secondary keys in response to a call from an application (10), application control (12) or supervisor (13) program. The calling program stores a message identifier primary key as the value of a variable and causes an event to be stacked for an event handler (19). The event handler (19) uses the message identifier to request composition of that message from central message service (17). Central message service (17) determines the user's national language index which together with the message identifier allow the message model to be retrieved from the message model data collection (18), and the message to be composed and stored in a variable accessible to the event handler (19). The event handler (19) uses that information to store values in variables accessible to the calling program. The calling program can then use the contents of those variables to determine whether the user's input has meaning recognized by the program.

6 Claims, 1 Drawing Figure

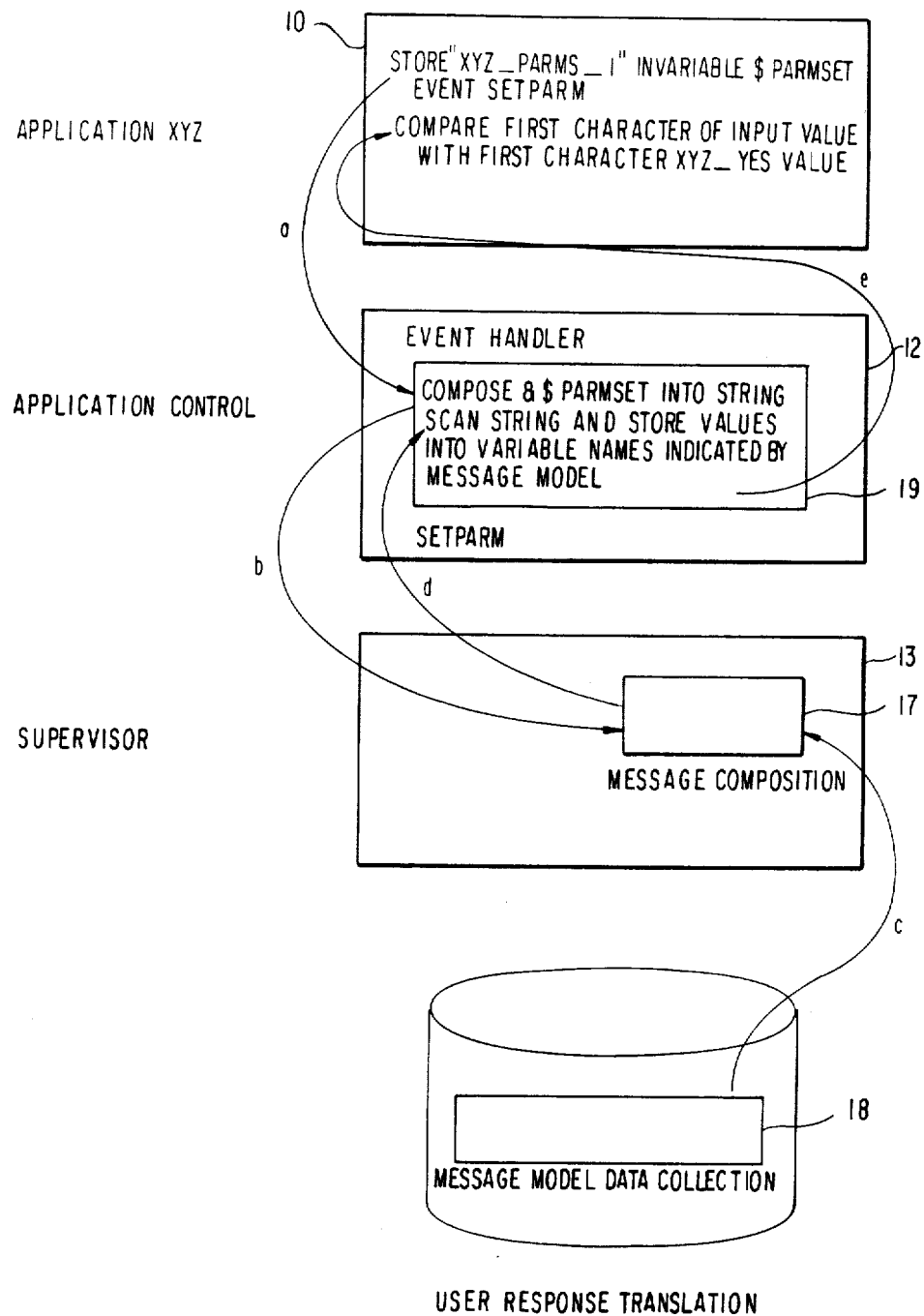

INTERACTIVE DATA PROCESSING SYSTEM HAVING CONCURRENT MULTI-LINGUAL INPUTS

RELATED APPLICATION

This application is related to application Ser. No. 480,418 filed Mar. 30, 1983, by John G. Innes, entitled CONCURRENT MULTI-LINGUAL USE IN DATA PROCESSING SYSTEMS, and assigned to a common assignee.

FIELD OF THE INVENTION

The present invention is directed to improvements in data processing systems which allow concurrent multi-lingual use, and more particularly, the invention allows a program to be independent of the national language in which an input to the data processing system is received.

BACKGROUND OF THE INVENTION

The change from centralized, batch operations of data processing systems to distributed, interactive usage has resulted in more users being directly involved with these systems. When a data processing system is used in a country with multiple national languages or is accessed by user terminals located in different countries with different national languages, the system must accept commands and respond in the national language or languages of the users. In the past, support for national languages has been accomplished by placing all messages in a selected national language, or on a user by user basis such that each user will see messages of one national language. The first approach fails to offer a solution for users in a country, such as Canada, where there are more than one national language. Both approaches handle output only, are typically limited to messages, and have the following problems:

1. Language-dependent text other than messages exist in most computers in the form of language dependent (a) command verbs entered as input, such as "Delete", which must be recognizable by a program without need for separate programs to handle each national language, (b) keywords entered as input in commands or as screen panel fields, such as "source", (c) online documentation, or (d) prompts and help information.

2. They do not allow appropriate responses from service functions in a connected computer that has no knowledge of the requestor's language preference. For example, a user may invoke service A on computer 1. Service A may request assistance from Service B on computer 2, and service B may need to send messages to the user even though the usage is indirect.

3. They do not allow use of a new function that is supported in a language that could be understood by the user if the preferred language is not yet available.

Even where the national language problem is solved, the fact that computer users are becoming more heterogeneous as the usage of computers spreads raises other problems. For example, not only may the national language preference of users in a distributed data processing system differ, but the level of experience or knowledge of the users may vary widely. In many cases, different classes of users need to use the same computer services, and this requires messages to be customized for each class of user. For example, a programmer could understand the message, "Node XYZ does not respond, reinitialization will take 10 minutes." and could arrange other work until it became available. However, mail room data entry personel whose work depends on node XYZ might more easily understand, "Take a 10 minute coffee break and then try again." Some messages could, of course, be understood by all classes of users. Therefore, not only are translations of all messages needed for users in different national languages, but some messages must be customized for different classes of users.

In my earlier application Ser. No. 480,418, I describe a data processing system which facilitates concurrent multilingual use which uses national language indexes together with specialized services to provide complete support in the national language preferred by the user. By "complete", I mean that the user will not sense output (e.g. see, hear, or feel in the case of braille) any other language unless it is one the user has specified as an acceptable alternative, and all input by the user (e.g. typed or spoken) is in the preferred national language. The national language indexes are selected either when the user is enrolled, or from the "Sign On" entry screen if users are not enrolled. More than one national language index is given per user, a primary index which identifies the language most preferred by a user, and one or more secondary indexes that identify languages that the user can understand even though they are not the preferred language. Use of these indexes allow all programs, including application, application control, and supervisor programs, to be independent of the user's chosen national language.

The national language indexes are used for a data collection that contains message models. Message models are stored via a message identifier primary key that is common for all usage and a secondary key that is the national language index. A central message service composes messages from message models by substituting language independent variable values before the message is shown to the user. More particularly, the message service receives requests for message text from application, application control, and supervisor programs. The requesting program supplies the message identifier, and the message service uses that as the primary key for retrieval from one or more data collections containing message models. The message service uses as a secondary key the national language index which is set when the user signs on to the computer. The message model data collections may be organized in any manner that allows use of primary and secondary keys. All such collections have a secondary key to identify the national language of the message model. In addition to the language index that is set when the user signs on, other values are set to identify an order of search among data collections according to the classification of the current user. The message service searches different data collections until it finds the first occurrence of the requested message model in the national language needed for a particular user. This classification index could be used as a tertiary index within a single data collection in an alternative implementation. That message model is composed and sent to application control. A message coordinator program in application control checks the message identifier and the type of output device to determine what action is necessary.

Separate data collections for each language contain other types of text that are more specialized or of greater volume than messages. These data collections contain the national language index as a standard part of their identifying name. The collections are made available for each user so the order of search for named elements will find the material in the primary (preferred) or secondary (usable) national language. Examples of use include on-line documentation, HELP texts, static text on display panels, and sample data for application programs or application usage environments. The idiosyncrasies and differences between languages create problems that sometimes are best solved by language-dependent versions of programs. Such cases are likely to occur when the program must be adjusted because of differences in length or format for the same information in different languages. The advantages of such data collections being available for all programs are that all input required of a user and all text responses to the user can be in the national language of the user and, therefore, concurrent, multi-lingual use of the system is possible. For example, a French speaking user and an English speaking user can use the same programs on the same system concurrently without encountering any text in the other user's language.

SUMMARY OF THE INVENTION

According to the present invention, a program is made independent of the national language in which the input to the computer is received. The national language index is used to obtain variable names and the text strings associated with each variable, in pairs. The program can obtain the variable-name/text-string pairs directly or a central service may be requested to store the text strings for retrieval via the variable name. The variable name has a particular meaning to the program and the associated text string is the language dependent input that will trigger that meaning. That is, input from the user can be compared with text strings associated with relevant variables to find the meaning known to a language-dependent program. National language indexes are used to locate the appropriate file to define command-verb synonyms, a technique common to other operating systems. The technique of variable-name/text-string pairs for use with various types of input is similar to, but more general than command-verb synonym processing.

Language dependent input to computers include things such as command verbs, command keywords, screen input fields, and acceptable synonyms or abbreviations of any of the foregoing. As a simple example, assume no abbreviations are allowed in a program XYZ written in the U.S. that can receive for input the values DELETE, RENAME, UPDATE, and CREATE. A message model would be defined with identifier XYZ INPUT-1, and which contained the following pairs of text strings:

| XYZ-DELETE | DELETE |
| XYZ-RENAME | RENAME |
| XYZ-UPDATE | UPDATE |
| XYZ-CREATE | CREATE |

A utility program is given the message identifier XYZ-INPUT-1, and it would perform the following services:

1. Request message service to provide message XYZ-INPUT-1 in the current user's national language.
2. From that message, store the string DELETE as the value for variable name XYZ-DELETE, store the string RENAME as the value for variable name XYZ-RENAME, and so on.

Program XYZ can now compare the input received with the value contained by the variables XYZ-. . . known to the program, and learn what was received.

Abbreviations can be handled with triplets of or n-tuples of values. As one example, assume abbreviations allow truncation from the right end of the word with some minimum number of letters required. Then the values stored could be as follows:

| XYZ-DELETE | DELETE 3 |
| XYZ-RENAME | RENAME 2 |
| XYZ-UPDATE | UPDATE 3 |
| XYZ-CREATE | CREATE 2 | where the number represents the minimum number of letters that will be accepted as an abbreviation. The utility program would store DELETE as the value of variable XYZ-DELETE, store 3 as the value of XYZ-DELETE-NO, and similarly for the other triples. The program now has enough information to look for partial abbreviations if a match is not found for the complete string DELETE. Other types of abbreviations could use the third value in the triple as a pattern to extract the abbreviation letters from the second value in the triple. For example, the preferred abbreviation of SHARED might be SHR, and XX.X.. would be used as the template to extract the abbreviation. The utility programs could contain special provision for non-European languages where truncation may be from the left, or where a character requires two bytes for storage.

BRIEF DESCRIPTION OF THE DRAWING

The foregoing and other objects, aspects and advantages of the invention will be better understood from the following detailed description of a preferred embodiment with reference to the drawing, the sole figure of which is a block diagram illustrating the flow of the user response translation according to the invention.

DESCRIPTION OF THE PREFERRED EMBODIMENT

My prior application Ser. No. 480,418 describes in detail the environment of concurrent multi-lingual use in data processing systems in which the present invention is used. Application Ser. No. 480,418 is incorporated herein by reference and the reader is referred to that application for further background information.

User response translation is required to allow user responses to a program in the preferred national language of a given user. This is required for general implementation of concurrent multi-lingual use of computers in which each user need know only one national language to deal with the computer, and programs are capable of interacting with all users regardless of their national language.

It is possible to design programs, and user interfaces to those programs, that do not require any language-dependent input. However, there can be negative effects on usability because the user may need to read and follow longer instructions than would be needed for language-dependent input. For example, it may be easier for the user to answer "yes or no?" or "on or off?" questions than it would be to read multiple choice selection instructions and follow them.

Two types of user responses will be used as examples to show means of implementing the invention:
1. The user gives text string responses to program output, e.g. the user types data in fields of a screen panel.
2. The user gives command responses to program output, e.g. the user types a command verb and its operands on a command line.

The invention does not depend on the method used to capture text-strings supplied by the user, and typing is used here as an example only.

As used in the description which follows, variables behave and can be used as if they were handled by an associative memory dedicated to a specific user's job. As used herein, "job" is synonymous with "session", "process" or "address space". That is,
1. Variable names and values are dynamically definable;
2. Values associated with a specific variable may be stored or fetched by name, i.e. the program that uses them does not know their storage location;
3. Storage and retrieval of variable values is managed by a Supervisor Service;
4. Variable values are accessible, i.e. may be fetched and stored by any program that runs for a specific user ("any program" includes Application, Application Control or Supervisor programs, and "Supervisor" is synonymous with "Operating System");
5. Variable values can be arithmetic, i.e. binary, or character strings; and
6. Implicit conversion between arithmetic values and character strings will occur automatically according to usage context, and explicit conversion in either direction can be requested.

The Supervisor (or Operating System) program characteristics relevant to the invention are as follows:
1. They contain components or services that run at highest priority;
2. They provide generic services and interfaces through which these services may be requested by either Application programs or Application Control programs; and
3. They include Message Services which includes a Message composition interface which composes message models (character strings) that may include recognizable variable names. If variable names appear in a message model, then the variable names will be replaced by the current values associated with those names. The message model to use in composition is determined by the following:
   a. A message context identifier (Message ID) which is the same regardless of national language;
   b. A primary (preferred) national language index stored as the value associated with a specific variable name when the user signed-on to the computer, or a secondary (acceptable) national language index defined and stored in a similar manner.

The Application Control characteristics relevant to the invention are as follows:
1. They are programs that run at the same priority as the Supervisor, and higher than Application programs.
2. They have an event logic. Events can be triggered by any of the following:
   a. any program that runs for a specific user;
   b. hardware on the local computer; or
   c. network data traffic from other computers.
Events are stacked until corresponding Application Control programs are free to handle them.
3. They have an event processing program to handle events created by the other programs. The events relay requests from either Application, Application Control, or Supervisor programs that act for the user.

Application program characteristics relevant to the invention are as follows:
1. They are fetched and begin to run at the request of an Application Control program in a given user's job.
2. They run or execute only when Application Control and Supervisor programs have no current work to do for the specific user, i.e. at the lowest priority.
3. They can request services provided by Supervisor programs or Application Control programs.
4. Their requests may be via macros, subroutines or function calls.
5. Their requests may cause events for Application Control programs.

Referring now to the drawing, the implementation of input translation for application use will be described. Assume application program XYZ 10 interacts with a user whose national language is English, and the same program XYZ must also be able to interact with users who prefer other national languages. Assume the application manages a display-screen panel that has one input field that needs a value (in English) "yes" or "no", and another input field that needs a value "on" or "off". The event handler in application control 12 for this example is named "SETPARM".

The sequence of events would be as follows:
1. Application program XYZ 10 will do the following during its initialization:
a. Store a Message ID as the value of a variable. The Message ID is the same for all languages, and the variable is one that would be accessible to all programs that run for this user. In this example, the Message ID "XYZ-PARMS-1" would be stored as the value for variable "$PARMSET".
b. Cause an Event to be stacked for Event Handler "SETPARM" 19 in Application Control 12 as indicated by the arrow a.
2. The Event Handler "SETPARM" 19 would do the following:
a. Obtain the message model whose name is stored in variable "$PARMSET". In the illustration, this is done with the control statement "COMPOSE &$PARMSET INTO STRING", where the ampersand means, "use the value contained in the variable $PARMSET". The COMPOSE statement passes control, as indicated by the arrow b, to Message Composition service 17 in the Supervisor 13 which does the following:
   (1) Determine the Language ID (i.e. an index value that defines the current user's preferred national language). This Lanugage ID would either be defined at user enrollment or when the user signs on, and stored as the value of a variable when the user's session begins.
   (2) Obtain the message model for Message ID "XYZ PARMS-1", corresponding to the Language Index for the current user, from the Message Model Data Collection 18 as indicated by arrow c.
   (3) Store the composed message in variable STRING. In this example, there are no substitutable variables in the message model, so the value of STRING is the same as the message model.
   (4) Return control to Event Handler SETPARM 19 in Application Control 12 as indicated by the arrow d.
b. SETPARM will parse the message model to find variable names, the values to be stored for those variables, and the minimum number of characters that would be accepted as an abbreviation. The message model would be

"XYZ-YES=YES,1;XYZ-NO=NO,1;XYZ-ON=ON,2;XYZ-OFF=OFF,3;".

The equivalent for a user who prefers Spanish might be

"XYZ-YES=SI,1;XYZ-NO=NO,1;XYZ-ON=1,1;XYZ-OFF=0,1;".

where the vertical bar and the circle are the international symbols for on and off, respectively.

c. Assign values to variable names. In the list below, the variable name appears to the left of the "=", and the value assigned to the variable name appears to the right.
XYZ-YES=YES
XYZ-YES-ABBR=1
XYZ-NO=NO
XYZ-NO-ABBR=1
XYZ-ON=ON
XYZ-ON-ABBR=2
XYZ-OFF=OFF
XYZ-OFF-ABBR=3

The variable names that end in "ABBR" contain the minimum number of characters that will be accepted as an abbreviation of the input value. Note that an abbreviation template could be used instead of the minimum length value, and this would allow abbreviations such as "SHR" for "SHARED".

d. Return control to the application program XYZ 10 as indicated by the arrow e.

3. If application program XYZ 10 had need to translate other input text, then this process could be repeated for other Message IDs. If on the other hand, the values shown above are sufficient, then application program XYZ can now use the values stored in the variables to learn whether the user's input has a meaning recognized by program XYZ. Typed input from the user may contain uppercase or lowercase letters, and because uppercase letters have internal computer codes different than lowercase letters, the application program must convert all letters to one case to allow valid comparison with values obtained from a message model. In this example, assume that the comparison is made in uppercase, and that the application program will convert user input text to uppercase before comparison is done. For the minimum abbreviation method, a substring of the user's input can be compared for equality against an equal length substring of the variable value—where the length of the substrings is determined by the value contained in the appropriate variable whose name ends with "ABBR". For the abbreviation template approach, the template could be used to select (by position) certain characters from the user's input and from the variable value, and then a comparison made for equality. Regardless of the method used to allow abbreviation, if the selected characters are the same, then the name of the variable, e.g. XYZ-ON, will show the meaning of the user's input, and appropriate action can be taken.

Because any program in the system (e.g. Supervisor, Application Control, or Application) may access variables and cause event requests to be stacked, any program in the system can be written to understand language-dependent input from the user. The preceding describes the invention for application program use, but the description also applies to Supervisor and Application Control programs because they too can store a Message ID in variable $PARMSET and cause an event for SETPARM.

The preceding description shows an application using input translation for words such as "on" and "off". When it is known that certain words are common to many programs, it would be more efficient to use input translation for common words at the time the user signs-on to the computer, and to store values in variables whose names have been established as a programming convention, e.g. SYSTEM-ON and SYSTEM-OFF.

Input command responses differ slightly from text string responses to a specific application program. Often commands are implemented as separate programs, where each program is responsible for handling operands included with the command verb. This means a method is needed to translate language-dependent command verbs so the appropriate program can be called into action. Two methods that can be used are as follows:

1. The program that accepts command line input can use input translation to learn what command verbs are valid in the language preferred by the user. This can be done as part of the initialization of the program that accepts command line input.

2. The program that accepts command line input can use the Language ID for the current user to find a command synonym data file corresponding to that language. The synonyms, and their acceptable abbreviations, can relate command verbs in the language preferred by the user to command verbs known to the developers of the programs.

The following example is valid regardless of the method used to translate command verbs. A command erase pqr xyz a (show
in English might have a Spanish equivalent
borra pqr xyz a (muestra
and allow "borra" to be abbreviated to the first two letters "bo". The BORRA command verb translation must be done by the program that receives the command first, especially if another program will be called to do the command action ERASE. Because the program that completes the command action is most familiar with input it expects, translation of the remainder of the input is now the responsibility of that program. That is, it can use the technique described above and shown in the drawing to learn that "muestra" or "show" mean the user needs a list of things erased.

What is claimed:

1. A method of providing a distrubuted, interactive data processing system with concurrent multi-lingual use by a plurality of users having different national language preferences, said method making said interactive data processing system independent of the national language in which a user input is received, comprising the steps of:

establishing a message model data collection by storing message models via a message identifier primary key that is common to all languages and a secondary key that is a national language index which indicates the national language preference;

using a central message service to compose messages from message models received from said message model data collection using said primary and secondary keys in response to a call from a calling program and communicating the composed messages to users in their national language preference;

said calling program initially storing a message identifier primary key as the value of a relevant variable;

obtaining a message model whose name is stored in the variable by determining a current user's national language preference and, using said secondary key, obtaining a message model corresponding to said secondary key from said meassage model data collection as the first mentioned message model whose name is stored in the variable, and storing a composed message based on said message model in said variable;

parsing said message model to find variable names and values to be stored for those variables whereby the variable names are common to all languages and the values are dependent upon the current user's natural language preference, then assigning said values to the found variable names;

said calling program then using the values stored in said variables to determine whether the user's input has meaning recognized by the calling program.

2. The method recited in claim 1 wherein said calling program is an application program, said application program performing the steps of storing said message identifier primary key and finally determining whether the user's input has meaning recognized by said application program.

3. The method recited in claim 1 wherein said calling program is an application control program, said application control program performing the steps of storing said message identifier primary key and finally determining whether the user's input has meaning recognized by said application program.

4. The method recited in claim 1 wherein said calling program is a supervisor program, said supervisor program performing the steps of storing said message identifier primary key and finally determining whether the user's input has meaning recognized by said supervisor program.

5. The method recited in claim 1 wherein the step of parsing includes finding a minimum number of characters that would be accepted as an abbreviation for each of said variables.

6. The method recited in claim 5 wherein the step of parsing also includes the step of finding abbreviation templates for each of said values.

* * * * *